United States Patent [19]

Van Ness et al.

[11] 4,353,991

[45] Oct. 12, 1982

[54] GLASS COMPOSITION AND METHOD OF MANUFACTURE AND ARTICLE PRODUCED THEREFROM

[75] Inventors: John F. Van Ness, Pittsburgh; G. Edward Donaldson, Gibsonia, both of Pa.

[73] Assignee: Ferro Corporation, Cleveland, Ohio

[21] Appl. No.: 253,574

[22] Filed: Apr. 13, 1981

[51] Int. Cl.³ .......................... C03C 7/00; C03C 9/00
[52] U.S. Cl. .................................. 501/20; 106/291; 501/17; 501/22; 501/61; 501/75; 501/77
[58] Field of Search .................. 106/291; 501/17, 20, 501/22, 61, 75, 77

[56] References Cited

U.S. PATENT DOCUMENTS

| | | | |
|---|---|---|---|
| 3,438,793 | 4/1969 | Martin | 501/20 |
| 3,835,087 | 9/1974 | Searight et al. | 106/291 X |
| 3,975,201 | 8/1976 | Greenstein | 501/20 X |

FOREIGN PATENT DOCUMENTS

| | | | |
|---|---|---|---|
| 52-51413 | 4/1977 | Japan | 501/20 |
| 54-156019 | 12/1979 | Japan | 501/17 |
| 56-5350 | 1/1981 | Japan | 501/61 |

*Primary Examiner*—Helen M. McCarthy
*Attorney, Agent, or Firm*—Baldwin, Egan, Walling & Fetzer

[57] ABSTRACT

A glass enamel composition and the method of its manufacture for use in providing a decorative glass or ceramic article and which composition comprises a glass frit mixed with a nacreous pigment, the mixture being dispersed in an application medium and adapted to be applied to the surface of a glass or ceramic article and fired at a temperature whereat the glass composition fuses to form a decorative and esthetic surface on said article.

25 Claims, No Drawings

GLASS COMPOSITION AND METHOD OF MANUFACTURE AND ARTICLE PRODUCED THEREFROM

FIELD OF INVENTION

This invention relates to a new and novel composition, method of making such composition and to a unique and decorative glass or ceramic article of manufacture made utilizing such composition.

PRIOR ART

Heretofore, in the art of the manufacture of decorative glassware, the decorative effects have been accomplished by using one of several methods; one incorporating ceramic pigments which are applied to the glassware and thereafter fired or fused thereto; secondly by coloring the glass melt prior to its being formed into the glassware; and thirdly by the use of organic coatings which are likewise applied by curing or the like to the article.

The present invention distinguishes from the aforesaid state of the art of decorative glassware by utilizing a nacreous or pearlescent pigment incorporated into a vitreous glass composition which is then applied to glass or ceramic ware and subsequently fired to an elevated temperature sufficiently to fuse said composition onto said ware whereby it provides a decorative pearlescent appearance to the applied surface(s) thereof.

SUMMARY OF INVENTION

The present invention relates to the manufacture and use of a glass composition having incorporated therein a nacreous or pearlescent pigment and to the article of glass or ceramic ware to which said composition may be applied to provide a decorative and an esthetic appearance thereto.

The glass composition of the present invention incorporates a conventional nacreous or pearlescent pigment such as of the type known in the art as Afflair Pigments manufactured by EM Chemicals and similar nacreous pigments made by The Mearl Corporation.

This pearlescent pigment is dispersed with a glass frit composition which may comprise glass frit particles which may be lead-bearing or lead-free compositions dispersed into a suitable application medium as for example a water-alcohol medium adapted for a spray application, and screen printing vehicles designed for screen printing applications. Several examples of such screen printing vehicles are disclosed in U.S. Pat. Nos. 4,243,710; 2,694,016; 3,089,782 and 3,052,573.

To this composition may be added selected inorganic color pigments or material, as will be understood in the art, such as for example a cobalt chrome iron oxide for effecting a black color; cadmium-selenium oxide for effecting a red color; chromium oxide for effecting a green color; and cobalt oxide for exhibiting a blue color, and other like selective inorganic color exhibiting materials well known in the art for producing a characteristic color.

This glass enamel composition is then applied to the surface of the glass or ceramic ware article and thereafter fired at an elevated temperature as determined by the glass frit and nacreous pigment composition whereby a vitreous pearlescent decorative coating is fused onto said surface.

DESCRIPTION OF INVENTION

The glass enamel composition of the present invention, as aforesaid, utilizes conventional nacreous or pearlescent pigments such as of the type presently commercially made and sold by EM Chemicals under the tradename Afflair Pigments and similar pearlescent pigments sold by The Mearl Corporation. Several examples of such pigments are disclosed in U.S. Pat. Nos. 3,087,828; 3,087,829; 3,634,119 and 3,819,566.

Typical examples of the chemical component structure of nacreous pigments utilized herein and as is also typical of such pigments described in the aforementioned U.S. patents are:

| White Stain Pigment | |
|---|---|
| $TiO_2$ Phase: | Antase |
| $TiO_2$ Content | 40–43% |
| $SnO_2$ Content | — |
| $Fe_2O_3$ Content | — |
| Mica Content: | 57–60% |
| Spec. Gravity: | approx. 2.9 |
| pH (10% Filtrate) | 8.0–9.5 |
| Moisture Loss: (105° C.) | 0.5% |
| Particle Size overall | 0–15 micron |
| Particle Size greatest conc. | |
| no less than 75% | 2–10 micron |
| no less than 50% | 2–10 micron |
| Oil Absorption (with boiled linseed oil): | 80–85 |
| Bulking Vol (lbs/gal) | approx. 1.75 |
| Heavy Metals: (in percent) (trace elements) | $Hg < 1 \times 10^{-4}$ $As < 1 \times 10^{-4}$ $Pb < 1 \times 10^{-3}$ |

| Pearl White Pigments | |
|---|---|
| $TiO_2$ Phase: | Antase |
| $TiO_2$ Content: | 23–27% |
| $SnO_2$ Content: | — |
| $Fe_2O_3$ Content: | — |
| Mica Content: | 73–77% |
| Spec. Gravity: | approx. 2.7 |
| pH (10% Filtrate): | 5.0–7.0 |
| Moisture Loss (105° C.) | <0.5% |
| Particle Size overall: | 0–100 micron |
| Particle Size greatest conc. | |
| no less than 75% | 20–100 micron |
| no less than 50% | 20–100 micron |
| Oil Absorption (with boiled linseed oil): | 91–96 |
| Bulking Vol (lbs/gal): | approx. 1.8 |
| Heavy Metals (in percent): (trace elements) | $Hg\ 1 \times 10^{-4}$ $As\ 1 \times 10^{-4}$ $Pb\ 1 \times 10^{-2}$ |

| Gold Pigment | |
|---|---|
| $TiO_2$ Phase: | Anatase |
| $TiO_2$ Content: | 35–40% |
| $SnO_2$ Content: | — |
| $Fe_2O_3$ Content: | 5–7% |
| Mica Content: | 54–59% |
| Spec. Gravity: | approx. 3.1 |
| pH (10% Filtrate) | 6.0–8.0 |
| Moisture Loss (105° C.) | 0.5% |
| Particle Size overall | 5–100 micron |
| Particle Size greatest conc. | |
| no less than 75% | 25–90 micron |
| no less than 50% | — |
| Oil Absorption (with boiled linseed oil): | 81–84 |
| Bulking Vol. (lbs/gal): | approx. 2.5 |
| Heavy Metals: (in percent) (trace elements) | $Hg < 1 \times 10^{-4}$ $As < 1 \times 10^{-4}$ $Pb < 1.5 \times 10^{-3}$ |

Other suitable conventional nacreous pigment compositions are disclosed in the published specifications of EM Chemicals Inc. dated Sept. 17, 1980.

As also previously mentioned, if desired, a specific color or tone may be given to the glass composition when utilizing any one of the nacreous pigments identified above by adding to said composition as will be hereinafter described in detail one or more of a number of inorganic color pigments, each of which is known in the art as providing a characteristic color according to its chemical structure. At present any one or several of the color pigments listed in the assignee's published color date of Nov. 24, 1980 and Jan. 1, 1981 may be utilized.

As presently manufactured, the glass frit and inorganic color pigment are added to each other and ground to a specified average particle size within the range of approximately 1.5 to 2.0 microns after which the nacreous pigment may be added.

The glass frit, as aforementioned, may be conventional in the art and be lead-bearing or lead-free compositions; several such lead-bearing compositions comprising the following fritted analysis after being smelted from conventional raw batch precursors using conventional smelting and quenching techniques:

| A | Approx. %/wt | B | Approx. %/wt |
|---|---|---|---|
| PbO | 69.01 | PbO | 55.33 |
| $SiO_2$ | 25.00 | $SiO_2$ | 28.87 |
| $Na_2O$ | 0.59 | $B_2O_3$ | 9.38 |
| $B_2O_3$ | 5.40 | CdO | 4.56 |
|  |  | $Al_2O_3$ | 1.13 |

| C | Approx. %/wt | D | Approx. %/wt |
|---|---|---|---|
| PbO | 71.08 | PbO | 54.52 |
| $SiO_2$ | 10.18 | $SiO_2$ | 28.93 |
| $B_2O_3$ | 11.18 | $Na_2O$ | 4.47 |
| CdO | 7.56 | $B_2O_3$ | 5.33 |
|  |  | $TiO_2$ | 3.35 |
|  |  | $ZrO_2$ | 3.40 |

| E | Approx. %/wt | F | Approx. %/wt |
|---|---|---|---|
| PbO | 75.03 | PbO | 57.00 |
| $SiO_2$ | 11.45 | $SiO_2$ | 29.00 |
| $B_2O_3$ | 13.61 | $Na_2O$ | 1.50 |
|  |  | $B_2O_3$ | 4.50 |
|  |  | Cd | 3.00 |
|  |  | $TiO_2$ | 2.00 |
|  |  | $ZrO_2$ | 2.00 |
|  |  | NaF | 1.00 |

| G | Approx. %/wt | H | Approx. %/wt |
|---|---|---|---|
| PbO | 65.00 | PbO | 61.36 |
| $SiO_2$ | 25.00 | $SiO_2$ | 24.98 |
| $Na_2O$ | 1.00 | $B_2O_3$ | 2.51 |
| $B_2O_3$ | 5.00 | CdO | 3.85 |
| CdO | 4.00 | $Li_2O$ | 0.49 |
|  |  | $TiO_2$ | 5.96 |
|  |  | $Na_2O$ | 0.85 |

| I | Approx. %/wt | J | Approx. %/wt |
|---|---|---|---|
| PbO | 62.36 | PbO | 50.33 |
| $SiO_2$ | 28.24 | $SiO_2$ | 34.40 |
| $B_2O_3$ | 3.82 | $B_2O_3$ | 7.98 |
| CdO | 4.11 | $Al_2O_3$ | 3.43 |
| $Na_2O$ | 1.18 | CdO | 2.85 |
| ZnO | .29 | $TiO_2$ | 1.01 |

An example of a fritted lead-free composition exhibits the following oxide analysis:

| K | %/wt |
|---|---|
| $K_2O$ | 4.66 |
| $Na_2O$ | 4.95 |
| $Li_2O$ | 1.66 |
| CaO | 0.21 |
| BaO | 4.73 |
| ZnO | 25.45 |
| $Al_2O_3$ | 3.58 |
| $B_2O_3$ | 31.47 |
| $Si_2O_3$ | 19.07 |
| $F_2$ | 2.23 |
| $Sb_2O_3$ | 1.97 |

In preparing any of the frit compositions as above defined for use in the glass enamel composition of the present invention, said frit is usually ball milled in a milling solution such as a mixture of water and alcohol.

If this glass composition is to have a characteristic color or tone representative of one or more particular color pigments as above identified, such color pigment(s) may be added at this stage to the ball mill and thoroughly mixed with the ground frit.

Alternately, the frit and color pigment may be added together and there ground to the desired conventional specifications.

If the application medium is to be adaptable for a spray application, the nacreous pigment is then added to this ground frit-nacreous pigment composition and thoroughly mixed therein to a homogenous mixture.

Then, to this ground frit-nacreous pigment composition is added the spray medium.

One example of such spray medium has the following compositional structure based on 100% of the total percentage of frit-pigment dry weight composition:

|  |  | % wt based on 100% of frit-pigment dry wt. composition |
|---|---|---|
| Methyl alcohol | 5% | Previously added as milling solution in ball mill. |
| Diethylene glycol | 3% |  |
| Sodium nitrite | 0.125% | Predissolved in water. |
| $H_2O$ | 25-40% |  |

A second example of spray medium has the following compositional structure:

| Methyl alcohol | 5% | Previously added as milling solution in ball mill. |
|---|---|---|
| To this is added a solution composed of: |  |  |
| 85% $H_2O$ |  |  |
| 15% Klucel E hydroxy propyl cellulose | } 15% |  |
| $H_2O$ | 25-40% |  |

A second application medium is one intended for use in screen printing applications.

In this application, the frit or frit-color pigment composition is dried to volatilize the milling solution, and the dried portion of this composition is then reduced to a powdered form. This resultant powdered composition may be combined using suitable conventional dispersion apparatus with the nacreous pigment and the screen printing medium. Alternatively, the screen printing medium may be added to the powdered composition and suitably dispersed at which point the nacreous pigment may also be added and mixed therewith.

Several screen printing mediums readily adaptable for use in this application are as follows:

| Example #1 | Approximate % by wt. |
|---|---|
| Pine Oil | 78.58 |
| Acrylic Resin (Elvocite 2044) | 18.50 |
| Lauryl sulfate | 2.92 |

| Example #2 | | Approximate % by wt. |
|---|---|---|
| Pine Oil | 78.58 | |
| Acrylic Resin | 18.50 | 80.0 |
| Lauryl sulfate | 2.92 | |
| Ester Alcohol | | 10.0 |
| Diethylene glycol mono butyl ether acetate | | 10.0 |

Suitable thermoplastic vehicles for use as screen printing mediums are disclosed in the aforementioned U.S. patents referred to on page 2 herein, and several such vehicles are listed below.

| | % by Weight | | |
|---|---|---|---|
| | A | B | C |
| Cetyl Alcohol | 68 | 13.79 | 73 |
| Acrylic Resin | 14 | 15.27 | 10 |
| Spermacetti Wax | 18 | | 10 |
| Stearyl Alcohol | | 69.19 | |
| Ethyl Cellulose | | 1.00 | 2 |
| Surfactant | | .75 | |
| Wood Resin | | | 5 |

The glass enamel composition of the present invention produced utilizing the above described components for use in a typical 100 lb. batch is as follows:

Example #1-Pearlescent

| Frit-Pigment Composition | | Approximate % by wt. of total composition |
|---|---|---|
| nacreous pigment | .5 to 25% | 80–55% |
| glass frit | 75 to 99.5% | |
| spray medium | | 20–45% |

Example #2-Tinted Pearlescent

| Frit-Pigment Composition | | Approximate % by wt. of total composition |
|---|---|---|
| nacreous pigment | .5 to 24% | 80–55% |
| glass frit | 50 to 99.4% | |
| inorganic color pigment | .1 to 27% | |
| spray medium | | 20–45% |

Example #3-Pearlescent

| Frit-Pigment Composition | | Approximate % by wt. of total composition |
|---|---|---|
| nacreous | .5 to 25% | 70–88 |
| glass frit | 75 to 99.5% | |
| screen printing medium | | 30–12 |

Example #4-Tinted Pearlescent

| Frit-Pigment Composition | | Approximate % by wt. of total composition |
|---|---|---|
| nacreous pigment | .5 to 25% | 70–88 |
| glass frit | 50 to 99.4% | |
| color pigment | .1 to 25% | |
| screen printing medium | | 30–12 |

In the application of the resultant composition to the surface of the ware to be decorated, said resultant composition i.e. (frit-pigment, application medium) is applied to the ware surface which is then fired to an elevated temperature within the range of approximately 1000°–1400° F., which range preserves the pearlescent quality of the nacreous pigment, and whereby said composition is fused to said surface to thus provide a distinctive, pearlescent, decorative and esthetic surface appearance.

This decorative effect may also be selectively applied to either the inside or outside surface when applying this composition coating to glass or ceramic ware in the form of bottles, jars, vases, table ware or like vessels.

What is claimed is:

1. In a vehicle-suspended, fritted glass enamel composition, adaptable to be applied to, and fired to fusion on, a vitreous substrate at a temperature from about 1000° F. to 1400° F., during which firing said vehicle is driven off, the improvement, in suspended, dispersed combination therewith, of a pigmenting amount of particulate, mica-based pearlescent pigment capable of retaining its pearlescent quality during and following said firing to fusion, so as to impart a pearlescent, translucent luster to the final, fused glass enamel.

2. The glass enamel composition of claim 1 wherein the pearlescent pigment has an average particle size between approximately 0 and 200 microns and a weight within the range of approximately 0.5 to 25% of the weight of the total weight of the frit-pigment composition, and the frit has a weight within the range of approximately 50 to 99.5% of the total weight of the frit-pigment composition, and the vehicle has a weight within the range of 12 to 45% of the weight of the total glass composition.

3. The glass enamel composition of claim 1 wherein the pearlescent pigment has an average particle size between approximately 0 and 200 microns and a weight within the range of approximately 0.5 to 25% of the weight of the total weight of the frit-pigment composition and the frit has a weight within the range of approximately 75 to 99.5% of the total weight of the frit-pigment composition, and the vehicle has a weight within the range of 20 to 45% of the weight of the total glass composition.

4. The glass enamel composition as defined in claim 1 wherein the vehicle is a mixture of the following components with the approximate percentage of weight of each component based on 100% of the dry weight of the frit-pigment composition:

| Methyl alcohol | 5% |
|---|---|
| Diethylene glycol | 3% |
| Sodium nitrite | 0.125% |
| $H_2O$ | 25–40% |

5. The glass enamel composition of claim 1 wherein the vehicle is a mixture of the following components with the approximate percentage of weight of each component based on 100% of the dry weight of the frit-pigment composition:

| | |
|---|---|
| Methyl alcohol | 5% |
| 85% H₂O<br>15% Klucel E (hydroxy propyl cellulose) | 15% |
| H₂O | 25–40% |

6. The glass enamel composition of claim 1 wherein the vehicle is a mixture of the following components with the approximate percentage of weight of each component based on 100% of the dry weight of the frit-pigment composition:

| | |
|---|---|
| Methyl alcohol | 5% |
| Diethylene glycol | 3% |
| Sodium nitrite | 0.125% |
| H₂O | 25 to 40% |

7. The glass enamel composition of claim 1 wherein the vehicle is a mixture of the following components with the approximate percentage of weight of each component based on 100% of the dry weight of the frit-pigment composition:

| | |
|---|---|
| Methyl alcohol | 5% |
| 85% H₂O<br>15% Klucel E hydroxy propyl cellulose | 15% |
| H₂O | 25–40% |

8. The glass composition of claim 1 wherein the glass frit composition comprises:

| | Approximate %/wt. |
|---|---|
| PbO | 55.33 |
| SiO₂ | 28.87 |
| B₂O₃ | 9.38 |
| CdO | 4.56 |
| Al₂O₃ | 1.13 |

9. The glass enamel composition of claim 1 wherein the glass frit composition comprises:

| | Approximate %/wt. |
|---|---|
| PbO | 69.01 |
| SiO₂ | 25.00 |
| Na₂O | 0.59 |
| B₂O₃ | 5.40 |

10. The glass enamel composition of claim 1 wherein the glass frit composition comprises:

| | Approximate %/wt. |
|---|---|
| PbO | 71.08 |
| SiO₂ | 10.18 |
| B₂O₃ | 11.18 |
| CdO | 7.56 |

11. The glass enamel composition of claim 1 wherein the glass frit composition comprises:

| | Approximate %/wt. |
|---|---|
| PbO | 54.52 |
| SiO₂ | 28.93 |
| Na₂O | 4.47 |
| B₂O₃ | 5.33 |
| TiO₂ | 3.35 |
| ZrO₂ | 3.40 |

12. The glass enamel composition of claim 1 wherein the glass frit composition comprises:

| | Approximate %/wt. |
|---|---|
| PbO | 75.03 |
| SiO₂ | 11.45 |
| B₂O₃ | 13.61 |

13. The glass enamel composition of claim 1 wherein the glass frit composition comprises:

| | Approximate %/wt. |
|---|---|
| PbO | 57.00 |
| SiO₂ | 29.00 |
| Na₂O | 1.50 |
| B₂O₃ | 4.50 |
| CdO | 3.00 |
| TiO₂ | 2.00 |
| ZrO₂ | 2.00 |
| NaF | 1.00 |

14. The glass enamel composition of claim 1 wherein the glass frit composition comprises:

| | Approximate %/wt. |
|---|---|
| PbO | 65.00 |
| SiO₂ | 25.00 |
| Na₂O | 1.00 |
| B₂O₃ | 5.00 |
| CdO | 4.00 |

15. The glass enamel composition of claim 1 wherein the glass frit composition comprises:

| | Approximate %/wt. |
|---|---|
| PbO | 61.36 |
| SiO₂ | 24.98 |
| B₂O₃ | 2.51 |
| CdO | 3.85 |
| Li₂O | 0.49 |
| TiO₂ | 5.96 |
| Na₂O | 0.85 |

16. The glass enamel composition of claim 1 wherein the glass frit composition comprises:

| | Approximate %/wt. |
|---|---|
| PbO | 62.36 |
| SiO₂ | 28.24 |
| B₂O₃ | 3.82 |
| CdO | 4.11 |
| Na₂O | 1.18 |
| ZnO | .29 |

17. The glass enamel composition of claim 1 wherein the glass frit comprises a mixture of:

|  | Approximate %/wt. |
| --- | --- |
| PbO | 50.33 |
| SiO$_2$ | 34.40 |
| B$_2$O$_3$ | 7.98 |
| Al$_2$O$_3$ | 3.43 |
| CdO | 2.85 |
| TiO$_2$ | 1.01 |

18. The glass enamel composition of claim 1 wherein the vehicle is a mixture of the following components with the approximate percentage of each component based on 100% of the total weight of said vehicle:

|  | Approximate %/wt. |
| --- | --- |
| Pine Oil | 78.58 |
| Acrylic Resin (Elvocite 2044) | 18.50 |
| Lauryl sulfate | 2.92 |

19. The glass enamel composition of claim 1 wherein the vehicle is a mixture of the following components with the approximate percentage of each component based on 100% of the total weight of said vehicle:

|  | Approximate %/wt. |  |
| --- | --- | --- |
| Pine Oil | 78.58 |  |
| Acrylic Resin | 18.50 | 80.0 |
| Lauryl sulfate | 2.92 |  |
| Ester alcohol |  | 10.0 |
| Diethylene glycol monobutyl ether acetate |  | 10.0 |

20. The glass enamel composition of claim 1 wherein the glass frit composition comprises:

|  | Approximate %/wt. |
| --- | --- |
| K$_2$O | 4.66 |
| Na$_2$O | 4.95 |
| Li$_2$O | 1.66 |
| CaO | 0.21 |
| BaO | 4.73 |
| ZnO | 25.45 |
| Al$_2$O$_3$ | 3.58 |
| B$_2$O$_3$ | 31.47 |
| Si$_2$O | 19.07 |
| F | 2.23 |
| Sb$_2$O$_3$ | 1.97 |

21. The glass enamel composition of claim 1 wherein one or more inorganic color pigments is interspersed throughout the vehicle to provide a distinctive color to the fused enamel.

22. In a thermoplastic resin vehicle-suspended, fritted glass enamel composition, adaptable to be applied to, and fired to fusion on, a vitreous substrate at a temperature from about 1000° F. to 1400° F., during which firing said vehicle is driven off, the improvement, in suspended, dispersed combination therewith, of a pigmenting amount of particulate, mica-based pearlescent pigment capable of retaining its pearlescent quality during and following said firing to fusion, so as to impart a pearlescent, translucent luster to the final, fused glass enamel.

23. The glass enamel composition of claim 22 wherein the thermoplastic vehicle for screen printing the glass composition onto glass or ceramic ware is a mixture of the following components with the approximate percentage of each component based on 100% of the total weight of said medium:

|  | % by wt. |
| --- | --- |
| Cetyl Alcohol | 68 |
| Acrylic Resin | 14 |
| Spermacetti Wax | 18 |

24. The glass enamel composition of claim 22 wherein the thermoplastic vehicle for screen printing is a mixture of the following components with the approximate percentage of each component based on 100% of the total weight of said medium:

|  | % by wt. |
| --- | --- |
| Cetyl Alcohol | 13.79 |
| Acrylic Resin | 15.27 |
| Stearyl Alcohol | 69.19 |
| Ethyl Cellulose | 1.00 |
| Surfactant | .75 |

25. The glass enamel composition of claim 22 wherein the thermoplastic vehicle for screen printing is a mixture of the following components with the approximate percentage of each component based on 100% of the total weight of said medium:

|  | % by wt. |
| --- | --- |
| Cetyl Alcohol | 73 |
| Acrylic Resin | 10 |
| Spermacetti Wax | 10 |
| Ethyl Cellulose | 2 |
| Wood Resin | 5 |

* * * * *

REEXAMINATION CERTIFICATE (503rd)
United States Patent [19]

Van Ness et al.

[11] B1 4,353,991

[45] Certificate Issued  May 13, 1986

[54] GLASS COMPOSITION AND METHOD OF MANUFACTURE AND ARTICLE PRODUCED THEREFROM

[75] Inventors: John F. Van Ness, Pittsburgh; G. Edward Donaldson, Gibsonia, both of Pa.

[73] Assignee: Ferro Corporation, Cleveland, Ohio

Reexamination Request:
No. 90/000,812, Jul. 2, 1985

Reexamination Certificate for:
Patent No.: 4,353,991
Issued: Oct. 12, 1982
Appl. No.: 253,574
Filed: Apr. 13, 1981

[51] Int. Cl.$^4$ ............ C03C 8/14; C03C 8/16
[52] U.S. Cl. ............ 501/20; 106/291; 501/17; 501/22; 501/61; 501/75; 501/77
[58] Field of Search ............ 106/291; 428/363; 501/17, 20, 22, 61, 75, 77

[56] References Cited

U.S. PATENT DOCUMENTS

| | | | |
|---|---|---|---|
| 3,438,793 | 4/1969 | Martin | 501/20 |
| 3,553,001 | 1/1971 | Kohlschutter et al. | 428/363 |
| 3,711,308 | 1/1973 | Brand et al. | 106/291 |
| 3,835,087 | 9/1974 | Searight et al. | 106/291 X |
| 3,874,890 | 4/1975 | Bernhard et al. | 106/291 |
| 3,926,659 | 12/1975 | Bernhard et al. | 106/291 |
| 3,975,201 | 8/1976 | Greenstein | 501/20 X |

FOREIGN PATENT DOCUMENTS

| | | | |
|---|---|---|---|
| 52-51413 | 4/1977 | Japan | 501/20 |
| 54-156019 | 12/1979 | Japan | 501/17 |
| 56-5350 | 1/1981 | Japan | 501/61 |
| 56-17944 | 2/1981 | Japan | |

OTHER PUBLICATIONS

Kirk–Othmer, "Encyclopedia of Chemical Technology", 3rd ed., vol. 9, p. 1-19, Wily & Son.
Data Sheets for IRIODIN® Ti100K (Oct., 1977), MK (Oct., 1977), FK (Oct., 1977), SK (Oct., 1977), LK (Sep., 1978), MTK (Jul., 1979) soloron-silver 100 (Oct., 1977), soloron-silver 100F (Oct., 1977), soloron-silver 100S (Oct., 1977), color B Ti 100K (Oct., 1977), color G Ti 100K (Oct., 1977), color R Ti 100K (Oct., 1977), color RB Ti 100K (Oct., 1977), color Y Ti 100K (Oct., 1977), color DY Ti 100K (Nov., 1977), color RY Ti 100K (Nov., 1977), colibri blue-green k (Nov., 1977), colibri red-brown (Nov., 1977).
U.S. Trademark Registration 1,006,004 for IRIODIN.

*Primary Examiner*—Helen M. McCarthy

[57] ABSTRACT

A glass enamel composition and the method of its manufacture for use in providing a decorative glass or ceramic article and which composition comprises a glass frit mixed with a nacreous pigment, the mixture being dispersed in an application medium and adapted to be applied to the surface of a glass or ceramic article and fired at a temperature whereat the glass composition fuses to form a decorative and esthetic surface on said article.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-25 is confirmed.

* * * * *